(12) United States Patent
Ogawa et al.

(10) Patent No.: US 9,053,746 B2
(45) Date of Patent: Jun. 9, 2015

(54) DISK DEVICE AND DATA RECORDING METHOD

(71) Applicant: KABUSHIKI KAISHA TOSHIBA, Tokyo (JP)

(72) Inventors: Kenji Ogawa, Kanagawa (JP); Hidekazu Masuyama, Kanagawa (JP); Michio Yamamoto, Tokyo (JP); Katsushi Ohta, Kanagawa (JP); Yuji Karakawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/190,748

(22) Filed: Feb. 26, 2014

(65) Prior Publication Data

US 2015/0085394 A1  Mar. 26, 2015

(30) Foreign Application Priority Data

Sep. 20, 2013  (JP) .................................. 2013-196217

(51) Int. Cl.
*G11B 5/012*  (2006.01)
*G11B 20/12*  (2006.01)

(52) U.S. Cl.
CPC .... *G11B 20/1252* (2013.01); *G11B 2020/1265* (2013.01); *G11B 2020/1222* (2013.01); *G11B 5/012* (2013.01)

(58) Field of Classification Search
CPC ............... G11B 2020/1264; G11B 2020/1265; G11B 2020/1277; G11B 5/012; G11B 5/59638; G11B 5/59666; G11B 11/10578; G11B 2220/40

USPC .......... 360/55, 22, 48, 63, 71, 72.1, 75, 77.08
See application file for complete search history.

(56) References Cited

U.S. PATENT DOCUMENTS

| | | | | |
|---|---|---|---|---|
| 5,457,703 | A  * | 10/1995 | Kakuta et al. | 714/766 |
| 6,067,199 | A  * | 5/2000 | Blumenau | 360/48 |
| 6,147,827 | A  * | 11/2000 | Southerland et al. | 360/53 |
| 6,321,237 | B1 * | 11/2001 | Yamamoto et al. | 1/1 |
| 8,306,398 | B2 * | 11/2012 | Murakami | 386/278 |
| 2005/0190685 | A1* | 9/2005 | Lee et al. | 369/275.3 |
| 2007/0268613 | A1* | 11/2007 | Fitzpatrick et al. | 360/75 |
| 2009/0290245 | A1* | 11/2009 | Motoki | 360/15 |

FOREIGN PATENT DOCUMENTS

JP         2009-283085  A       12/2009

* cited by examiner

*Primary Examiner* — Thomas Alunkal
(74) *Attorney, Agent, or Firm* — Patterson & Sheridan, LLP (57) ABSTRACT

A disk device includes a recording medium having a plurality of recording surfaces, where each of the recording surfaces includes a system region for recording system data related to an operation of the disk device, and a controller configured to control recording of the system data in the system region. The controller is further configured to divide the system data to be recorded into a plurality of portions of divided data of the same size. The controller is further configured, after recording of a first portion of divided data in a first system region disposed on a first recording surface, to start recording a second portion of divided data in a second system region disposed on a second recording surface. The recording of the second portion of divided data is started after a switching time, during which switching from the first recording surface to the second recording surface transpires.

20 Claims, 6 Drawing Sheets

DISK DEVICE AND DATA RECORDING METHOD

CROSS-REFERENCE TO RELATED APPLICATION

This application is based upon and claims the benefit of priority from Japanese Patent Application No. 2013-196217, filed Sep. 20, 2013, the entire contents of which are incorporated herein by reference.

FIELD

Embodiments described herein relate generally to a disk device and a data recording method.

BACKGROUND

In recent years, in disk devices such as hard disk drives (HDD), data is recorded on a recording medium, for example, a magnetic disk. Magnetic disks include a recording region for recording user data and a recording region for recording system data related to an operation of a disk device. In some cases, in order to protect the system data from data loss or data deterioration, the system data may be recorded with duplication.

Protection of data by duplication of the data may require an impractically large amount of time to record the system data. Therefore, embodiments described herein provide a disk device which can properly protect system data and record the system data in a shorter time, and a data recording method.

DETAILED DESCRIPTION

In general, according to one embodiment, a disk device provided with a recording medium having a plurality of recording surfaces, in which each of the recording surfaces is provided with a system region for recording system data related to an operation of the disk device, includes a controller which controls recording of the system data in the system region. The controller is configured to divide the system data being recorded into multiple portions of divided data of the same size, and after recording a first portion of divided data in a first system region disposed on a first recording surface, the recording of a second portion of divided data different from the first portion of divided data in a second system region disposed on a second recording surface is started. A time for switching from the first recording surface to the second recording surface occurs between the recording of the first data division and the second data division.

Hereinafter, embodiments will be described using the drawings. The present disclosure is not limited to the following embodiments, and in practice, constituent elements may be modified and embodied without departing from the scope thereof. Also, by properly combining the constituent elements disclosed in the following embodiments, various exemplary embodiments can be formed. For example, some constituent elements may be deleted in some embodiments. In addition, constituent elements in other embodiments may be properly combined.

Figure 1:
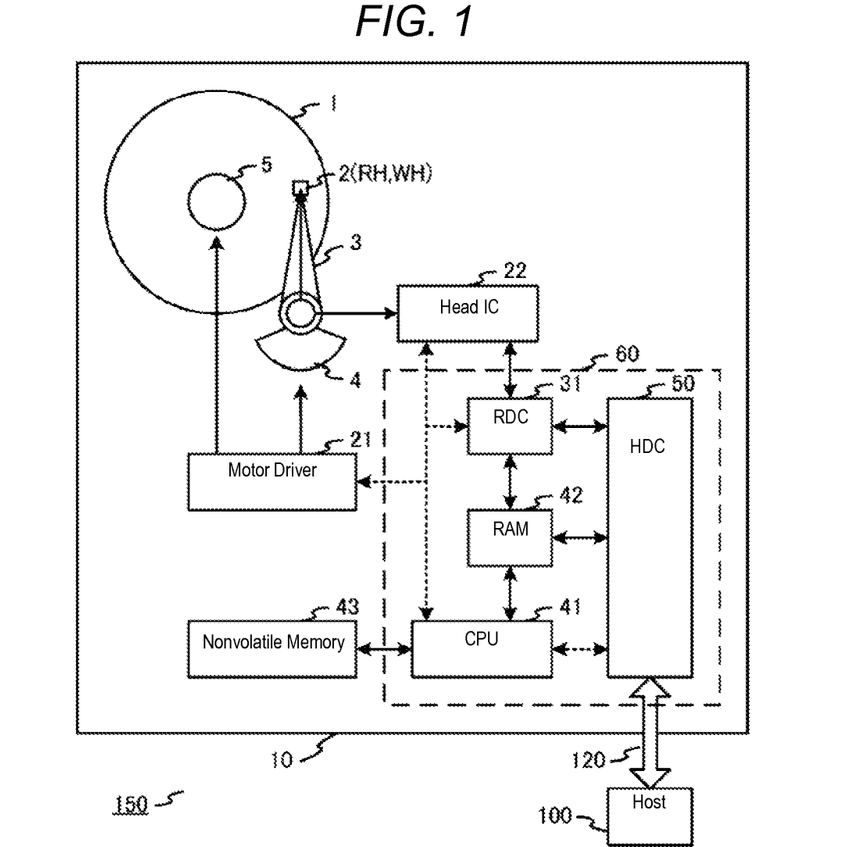
FIG. 1 is a block diagram showing a configuration of an electronic system provided with a hard disk drive (HDD) which is a disk device according to an embodiment.

FIG. 1 is a block diagram showing a configuration of an electronic system 150 provided with a hard disk drive (hereinafter, also referred to as HDD) 10 as a disk device according to an embodiment. The electronic system 150 is provided with a host 100 and the HDD 10. A host I/F 120 connects the host 100 to the HDD 10 and is used to transmit and receive commands and user data between the host 100 and the HDD 10. The host I/F 120 conforms to serial advanced technology attachment (SATA) standards or serial attached SCSI (SAS) standards. The HDD 10 is connected to the host 100 via the host I/F 120 to function as a disk device of the host 100. For example, the electronic system 150 is a personal computer, mobile equipment, or a server device. In addition, for example, the host 100 is a chip set IC provided in a personal computer or a mobile device, or a server controller provided in a server device.

The HDD 10 includes a head disk assembly (HDA) including a magnetic disk 1, a slider 2, an arm 3, a voice coil motor (VCM) 4, and a spindle motor (SPM) 5. In addition, the HDD 10 includes a circuit block including a motor driver 21, a head IC 22, a nonvolatile memory 43, and a controller 60.

The controller 60 includes a read write channel IC (hereinafter, also referred to as RDC) 31, a CPU 41, a RAM 42, and a hard disc controller (HDC) 50. As the RAM 42, a DRAM (SDRAM) or a SRAM is utilized that is a volatile memory capable of performing data transfer at a higher speed than the magnetic disk 1. The nonvolatile memory 43 may be a nonvolatile recording unit, a NOR memory which is represented by a flash memory, a semiconductor memory such as a NAND memory, or a partial recording region of the magnetic disk 1.

The HDD 10 according to the embodiment executes a process of recording data on the magnetic disk 1 (writing process) and a process of reading the data recorded on the magnetic disk (reading process). The writing process and the reading process are executed in response to a command which is transmitted from the host 100 or a spontaneous execution request in the HDD 10. These processes are controlled in accordance with a program (firmware) which is executed by the CPU 41. The data of the program is stored in the nonvolatile memory 43 or the magnetic disk 1.

The magnetic disk 1 is rotated by the SPM 5. The rotation of the SPM 5 is controlled with a driving current from the motor driver 21. The arm 3 and the VCM 4 constitute an actuator. The actuator moves (seeks) a head (not shown) installed in the slider 2 to a target position on the magnetic disk 1. That is, the actuator moves the slider 2 (specifically, the head) installed in the arm 3 in a radial direction on the disk 1 through the driving of the VCM 4. The VCM 4 is controlled with a driving current from the motor driver 21.

The magnetic disk 1 includes a recording surface, and a plurality of cylinders (tracks) are configured in the recording surface. The recording surface of the magnetic disk 1 includes a system region for recording servo data for specifying a position of the head on the recording surface and system data, and a data region for recording user data which is transmitted from the host 100. The system data includes data related to an operation of the HDD 10 and data related to the writing process and the reading process. The system region is disposed on, for example, a region on the outer circumferential side of the magnetic disk 1. That is, the magnetic disk 1 is configured as a recording medium for recording data. The system data may be recorded not only in the system region, but also in the nonvolatile memory 43. The system data may be deployed in the RAM 42 during the operation of the HDD 10 and be recorded (copied) in the system region of the magnetic disk 1 or in the nonvolatile memory 43 from the RAM 42 in case a power supply of the HDD 10 (specifically, the RAM 42) fails.

The slider 2 includes the head including a reading head RH and a writing head WH. The reading head RH reads recorded data based on the cylinder on the magnetic disk 1. The read data includes servo data, user data, and system data. The writing head WH writes user data and system data on the magnetic disk 1. The reading head RH is configured as a reader, and the writing head WH is configured as a recorder. In this embodiment, two or more magnetic disks 1 are provided and two or more heads are provided corresponding to the recording surfaces of the respective magnetic disks 1. Each of the recording surfaces of the magnetic disks 1 is provided with a system region.

The head IC 22 includes a reading amplifier and a writing driver (both not shown). The reading amplifier amplifies a reading signal read by the reading head RH and transmits the reading signal to the RDC 31. The writing driver transmits, to the writing head WH, a write current according to writing data output from the RDC 31.

The controller 60 is formed from a single-chip integrated circuit including the RDC 31, the CPU 41, the RAM 42, and the HDC 50. The RDC 31 includes a reading channel and a writing channel (both not shown). The reading channel processes a reading signal read by the reading head RH to decode data including servo information. The writing channel executes a signal process of writing data from the HDC 50. The RAM 42 may be provided outside the controller 60.

The HDC 50 controls the RAM 42 to control data transfer between the host 100 and the RDC 31. The HDC 50 executes data transfer control by temporarily storing the reading data and writing data in the RAM 42. In addition, the HDC 50 controls the nonvolatile memory 43 to store and read system data and a program which is executed by the CPU 41. When the RAM 42 is provided on the outside, the HDC 50 records and reads system data in the RAM 42. The HDC 50 is configured as an interface which controls transmission and reception of commands and data between the host 100 and the HDD 10.

The CPU 41 is also referred to as a microprocessor or a microcontroller. The CPU 41 executes control for positioning (servo control) of the head by controlling the VCM 4 via the motor driver 21. In addition, the CPU 41 controls a writing process and a reading process with respect to the magnetic disk 1 via the RDC 31. The CPU 41 controls a process for managing the system region in which the system data related to the writing process and the reading process is recorded. The CPU 41 controls these processes using the HDA and the circuit block in accordance with a program.

By virtue of such a configuration, the HDD 10 according to this embodiment can execute a plurality of processes which will be described below in detail.

Figure 2:
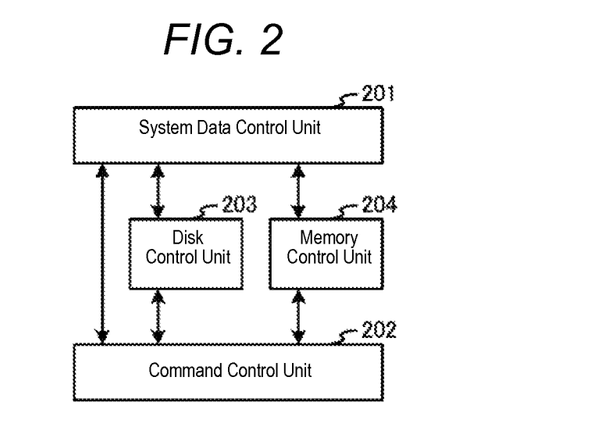
FIG. 2 is a configuration diagram for illustrating modules which execute a system data writing process and a system data reading process according to the embodiment.

Next, modules which are provided in the HDD 10 according to this embodiment and execute a system data writing process and a system data reading process will be described using FIG. 2. FIG. 2 is a configuration diagram for illustrating modules which execute a system data writing process and a system data reading process according to this embodiment.

The HDD 10 of this embodiment is provided with a system data control unit 201, a command control unit 202, a disk control unit 203, and a memory control unit 204. These modules are configured from the HDA and the circuit block provided in the HDD 10 and, and the program which is executed by the CPU 41. That is, the writing process and the reading process according to this embodiment are executed by these modules.

The system data control unit 201 manages the system data which is recorded in the system region of the magnetic disk 1. The system data control unit 201 updates the system data in accordance with an operation of the HDD 10 and records the updated system data in the magnetic disk 1, the nonvolatile memory 43, or the RAM 42 via the disk control unit 203 or the memory control unit 204. The system data control unit 201 updates the system data in accordance with a notification from the command control unit 202, or in a background process that is independent of a notification from the command control unit 202. When the system data is recorded on the magnetic disk 1, the system data control unit 201 divides the system data being recorded into multiple portions of divided data, and generates parity data based on the divided system data. The system data control unit 201 determines a recording surface in which the divided system data and the generated parity data are to be recorded, among the recording surfaces of the plurality of magnetic disks 1. In addition, the system data control unit 201 reads the system data from the magnetic disk 1, the nonvolatile memory 43, or the RAM 42 via the disk control unit 203 or the memory control unit 204 in accordance with the operation of the HDD 10. In the case of reading from the magnetic disk 1, the system data control unit 201 determines a recording surface from which the system data and the parity data (associated with this system data) are to be read, from among the recording surfaces of the plurality of magnetic disks 1. When the read system data includes divided portions of data, the system data control unit 201 recombines the divided portions of data to restore the system data that is being read. In addition, if necessary, the system data control unit 201 restores the system data using the read parity data, for example when one of the multiple portions of divided data cannot be successfully read.

The command control unit 202 notifies the system data control unit 201, the disk control unit 203, or the memory control unit 204 of a request for execution of a process in response to a command transmitted from the host 100, or in response to a spontaneous execution request in the HDD 10. In addition, the command control unit 202 transmits a response command associated with the host 100 in accordance with the notification from the disk control unit 203 or the memory control unit 204. The command control unit 202 notifies the system data control unit 201 of, for example, a request for execution of a process of updating or reading the system data in response to a command which is transmitted from the host 100.

The disk control unit 203 controls transmission and reception of data to and from the magnetic disk 1. The disk control unit 203 executes a writing process or a reading process associated with the recording surface of the magnetic disk 1 in accordance with, for example, a notification from the command control unit 202. In addition, the disk control unit 203 executes a writing process and a reading process of system data and parity data (associated with this system data) using the recording surface of any of the plurality of magnetic disks 1 in accordance with an instruction from the system data control unit 201. When executing a writing process to different recording surfaces, the disk control unit 203 provides a predetermined time between the completion of writing on a first recording surface (or using a writing head WH corresponding thereto) and a time in which writing on a second recording surface (or using a writing head WH corresponding thereto) is started. In other words, when executing a writing process on different recording surfaces, the disk control unit 203 allocates a predetermined time period to execute the writing process and a time period for switching the writing process to a different recording surface (a writing head WH corresponding thereto).

The memory control unit 204 controls transmission and reception of data to and from the nonvolatile memory 43 or the RAM 42. The memory control unit 204 transmits and receives system data to and from the nonvolatile memory 43 or the RAM 42 in response to a request for updating, recording, or reading of the system data by the system data control unit 201. That is, the memory control unit 204 transmits the data read from the nonvolatile memory 43 or the RAM 42 to the system data control unit 201 in response to a request from the system data control unit 201. In addition, the memory control unit 204 saves the system data received from the system data control unit 201 in the nonvolatile memory 43 or the RAM 42.

According to the disk device and the data recording method of this embodiment, it is possible to properly protect the system data and record the system data in a shorter time by virtue of the above-described configuration.

Figure 3:
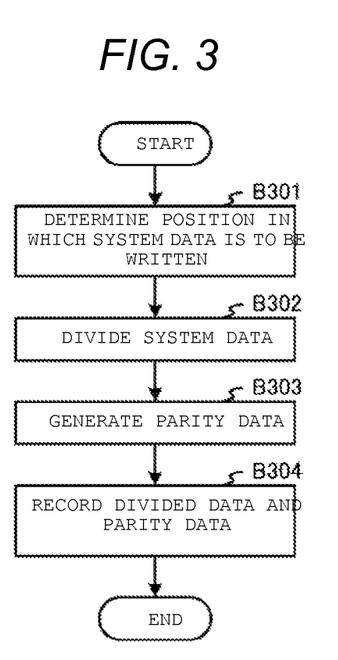
FIG. 3 is a flowchart for illustrating the system data writing process according to the embodiment.

Next, an operation of the system data writing process which is executed in the HDD 10 according to this embodiment will be described using FIG. 3. FIG. 3 is a flowchart for illustrating the system data writing process according to the embodiment.

The system data writing process according to the embodiment is a process of recording system data in the system region of the magnetic disk 1. The system data are updated in accordance with an operation of the HDD 10 and using parity data associated with the system data. As described above, the system data and the parity data associated therewith are divided into equal-sized portions and recorded on the recording surface of any of the plurality of magnetic disks 1. Hereinafter, the operation thereof will be described in detail.

First, the system data control unit 201 determines a position in which system data is to be recorded (B301). Specifically, the system data control unit 201 determines a magnetic disk 1 having a system region in which recording is to be performed, among the plurality of magnetic disks 1. Next, the system data control unit 201 divides system data to be recorded (B302). Specifically, the system data control unit 201 divides system data that is to be recorded in separate portions of data, where the number of separate portions of data is smaller by 1 than the number of system regions determined as recording positions. In other words, the number of separate portions of data is smaller by 1 than the number of recording surfaces provided with the determined system regions, respectively, or the number of writing heads WH corresponding to the determined system regions, respectively. In this case, the system data is divided so that the divided portions of system data (hereinafter, also referred to as "divided data") have the same size.

Based on each portion of divided data, the system data control unit 201 generates parity data having the same size as each portion of divided data (B303). For example, each portion of divided data is subjected to an exclusive-OR operation (XOR operation) to obtain parity data having the same size as each portion of divided data. The parity data is generated using a program which is executed by the CPU 41, or hardware which is built in any of the circuit blocks.

The system data control unit 201 instructs the disk control unit 203 to record the portions of divided data and the generated parity data in a plurality of system regions selected as recording positions. The disk control unit 203 records the portions of divided data and the generated parity data in the selected recording positions (B304). Specifically, the disk control unit 203 records the portions of divided data and the parity data in a plurality of system regions disposed on different recording surfaces, respectively. In the process of recording in the plurality of system regions, the disk control unit 203 starts the writing process in a second system region of the plurality of system regions after the completion of the writing process in a first system region. The second system region is selected based on a duration of time associated with switching the writing head WH after completion of the writing process in the first system region to the second system region. The system data writing process is then terminated.

The above-described operation is just an example, and other modified examples may be applied. For example, when the system data cannot be divided into the same size portions, the system data control unit 201 may divide the data so that one portion of divided data has a size smaller than others and other portions of divided data have the same size which is larger than that of the one portion of divided data. By adding data having a predetermined pattern to the one portion of divided data having a smaller size, the one portion of divided data may have the same size as other portions of divided data. Here, the system data control unit 201 may add data having a predetermined pattern to system data being recorded, and then may perform the division so that the divided data portions have the same size, rather than adding the data having a predetermined pattern after the division.

In addition, the system data control unit 201 may exclude a specific system region as a position in which the system data is recorded. Specifically, as a position in which the portions of divided data and the parity data are recorded, a recording surface provided with a specific system region or a writing head WH corresponding to the system region may be excluded. For example, a writing process using a recording surface (or a writing head WH) having poorer recording characteristics and reading characteristics than others among a plurality of recording surfaces having a system region (or a plurality of writing heads WH corresponding to the recording surfaces) may be skipped.

In the above-described series of operations, data related to the recording of system data (hereinafter, also referred to as SD-related data) is recorded in the nonvolatile memory 43 or the RAM 42 via the memory control unit 204. The SD-related data includes information related to the division of system data (the number, size, and the like, of portions of divided data) and information related to the recording positions of the divided data and the parity data (heads and cylinders in which data is recorded, sectors in which recording is started, and the like). The SD-related data is preferably recorded in the nonvolatile memory 43 since the SD-related data is needed when the divided data and the parity data are read from the system region after power is applied to the HDD 10. This SD-related data is included in the system data.

In this manner, the system data writing process according to this embodiment is executed. In this process, system data is divided into a plurality of portions of data having the same size. In addition, parity data having the same size as each portion of data is generated based on the plurality of portions of divided data which is obtained by dividing the system data. The respective portions of divided data and the parity data are recorded in a plurality of system regions disposed on different recording surfaces. The recording in a plurality of system regions of different recording surfaces is executed so that a smaller time cost results when switching the writing head WH during the recording process from one of the plurality of system regions to another of the system regions. Thus, according to the disk device and the data recording method of this embodiment, it is possible to properly protect the system data and record the system data in a shorter time by virtue of the above-described configuration.

Figure 4:
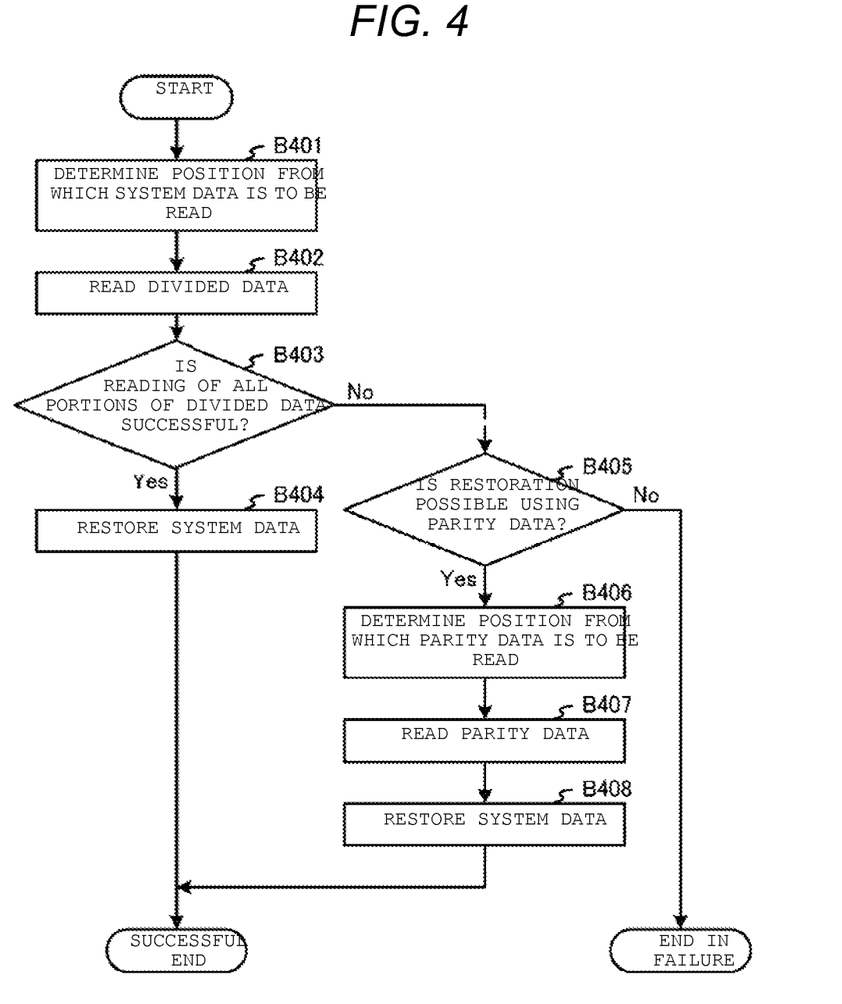
FIG. 4 is a flowchart for illustrating the system data reading process according to the embodiment.

Next, an operation of the system data reading process which is executed in the HDD 10 according to this embodiment will be described using FIG. 4. FIG. 4 is a flowchart for illustrating the system data reading process according to the embodiment.

As described above, the system data and the parity data thereof are divided and recorded in the plurality of recording surfaces of the plurality of magnetic disks 1 with the system data writing process. That is, the system data reading process according to the embodiment is a process of reading the system data and the parity data thereof from the plurality of recording surfaces. Hereinafter, the operation thereof will be described in detail.

First, the system data control unit 201 determines a position (system region) from which system data is to be read (B401). Specifically, the system data control unit 201 determines a magnetic disk 1 including a recording surface provided with a system region from which reading is to be performed, among the plurality of magnetic disks 1. For example, the system data control unit 201 reads SD-related data from the nonvolatile memory 43 or the RAM 42 via the memory control unit 204. The system data control unit 201 can determine a position from which system data is to be read (including each portion of divided data), based on the read SD-related data.

Next, the system data control unit 201 instructs the disk control unit 203 to read the system data from the determined position, and the disk control unit 203 executes reading of the divided data from the instructed position (B402). In the reading from the plurality of system regions, the disk control unit 203 starts the reading from a recording surface. The recording surface selected for reading is a recording surface with which a smaller time cost is associated when switching the reading head RH from a first reading head RH previously used in the process of reading from the plurality of system regions to the next reading head being used in the process. The time cost occurs after the reading from the first recording surface is completed. When a specific system region (i.e., a recording surface provided with the system region or a writing head WH corresponding to the system region) is excluded as a position in which the system data is to be recorded, the disk control unit 203 does not perform a reading process using the excluded system region. Alternatively, the disk control unit 203 does not perform a reading process using the excluded the writing head WH.

The system data control unit 201 determines whether the reading of all the portions of divided data portions corresponding to the system data to be read succeeds (B403). Specifically, the system data control unit 201 determines whether there is a portion of divided data that cannot be successfully read, among all the portions of divided data to be read. When the reading succeeds (Yes in B403), the system data control unit 201 restores the system data from all the portions of read divided data (B404), and the system data reading process is terminated as a success. On the other hand, when the reading does not succeed (when the reading fails, or there is divided data which is not possible to be corrected) (No in B403), the system data control unit 201 determines whether the system data which is not read (system data to be restored by all the portions of read divided data) can be restored using parity data (B405). Specifically, the system data control unit 201 determines whether there is only one portion of divided data which is not read. In other words, it is determined whether the number of portions of divided data which are not read, or the number of portions of divided data which are not possible to be corrected is only one.

When it is determined that the restoration is possible using parity data (Yes in B405), the system data control unit 201 determines a position from which the parity data is to be read, based on the SD-related data read from the nonvolatile memory 43 or the RAM 42 (B406). The system data control unit 201 instructs the disk control unit 203 to read the parity data from the determined position, and the disk control unit 203 executes reading of the parity data from the determined position (B407). Using the read parity data, the system data control unit 201 restores the system data which is not read (B408). In this case, the system data reading process is also terminated as a success. The restoration of the system data using the parity data is executed by a program which is executed by the CPU 41, or hardware which is built in any of the circuit blocks. On the other hand, when it is determined that the system data that cannot be read also cannot be restored using the parity data (No in B405), the system data reading process is terminated as a failure.

The above-described operation is just an example, and other modified examples may be applied. For example, the system data control unit 201 may read the parity data simultaneously with all the portions of divided data, rather than reading the parity data after a determination is made that the restoration of the system data which is not read is possible. In addition, when it is determined that the system data which is not read cannot be restored using the parity data, the host 100 may be notified of an error via the command control unit 202.

In addition, in the system data writing process, when there is divided data to which data having a predetermined pattern is added since the system data cannot be divided into the same size portions, the system data control unit 201 excludes the data having a predetermined pattern from the divided data and restores the system data with other read divided data.

In this manner, the system data reading process according to this embodiment is executed. In this process, system data is restored from a plurality of portions of read divided data. When there is an error in one of the plurality of portions of read divided data, the restoration of the system data is tried using read parity data. In addition, the reading from a plurality of system regions of different recording surfaces is executed so that a smaller time cost results when switching from one reading head RH to another reading head RH during the process of reading from the plurality of system regions. That is, according to the disk device and the data recording method of this embodiment, it is possible to properly protect the system data and restore the recorded system data in a shorter time by virtue of the above-described configuration.

Figure 5A:
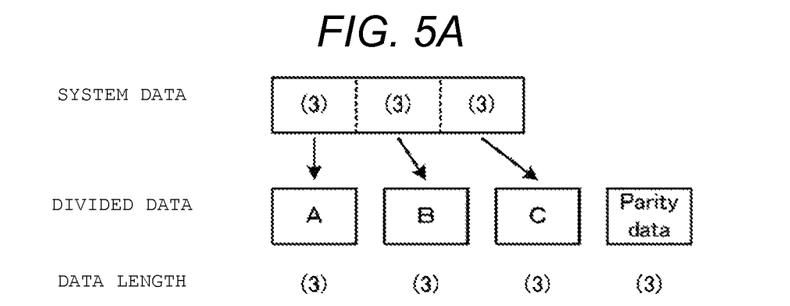
FIGS. 5A and 5B are diagrams conceptually showing operations of the system data writing process and the system data reading process according to the embodiment.
Figure 5B:
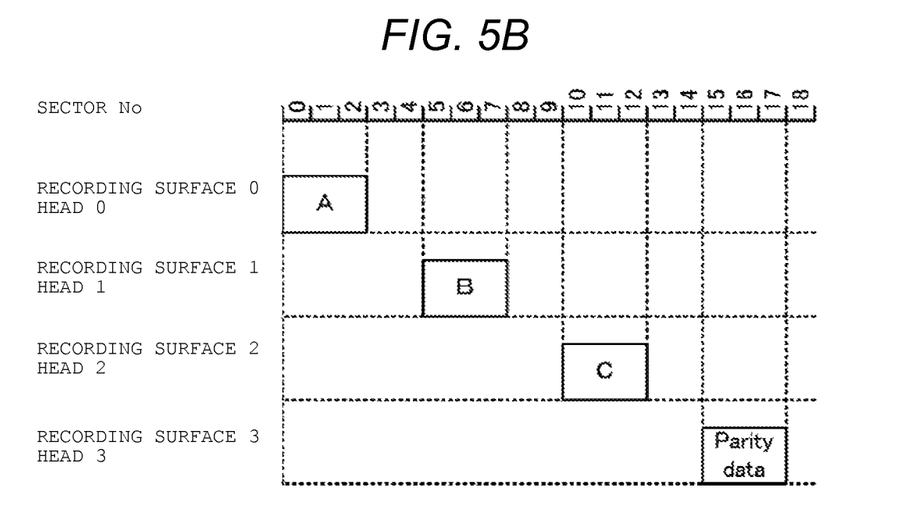

Next, conceptual operations of the system data writing process and the system data reading process according to the embodiment will be described using FIGS. 5A and 5B. FIGS. 5A and 5B are diagrams conceptually showing operations of the system data writing process and the system data reading process according to the embodiment.

FIG. 5A is a diagram conceptually showing a process of dividing system data. Here, the length of the system data which is a recording target corresponds to nine sectors, and this system data is divided into three. The sector is a data recording unit with respect to the magnetic disk 1. As shown in FIG. 5A, the system data which is a recording target is divided into three portions of divided data A, B, and C. The portions of divided data A, B, and C have the same length corresponding to three sectors. In addition, parity data having the same length as each of portions of divided data A, B, and C is generated. That is, in this operation example, the three portions of divided data A, B, and C, as well as the parity data associated therewith, each have a data length corresponding to three sectors. The three portions of divided data A, B, and C and the parity data are each recorded in a different recording region. The different recording regions may refer to different recording surfaces having different recording regions, or different heads corresponding to different recording regions.

FIG. 5B is a diagram conceptually showing a writing process and a reading process related to the plurality (three) of portions of divided data A, B, and C and the parity data. First, the writing process will be described. As illustrated using FIG. 5A, the three portions of divided data A, B, and C and the parity data are recorded in different recording regions (in different recording surfaces or using different heads). In the example shown in FIG. 5B, the portions of divided data A, B, and C and the parity data are recorded in recording surfaces 0 to 3 using heads 0 to 3, respectively. In each track on each recording region of each recording surface, a sector 0 is defined as the number of a first sector, and basically, data recording in each track is started from the sector 0.

Here, as described above, the writing of recording target data (i.e., system data) in a second of a plurality of system regions is started so that a smaller time cost results when switching the writing head WH to the second system region from a first system region of the plurality of system regions, where the switching is performed after the writing in the first of the plurality of system regions is completed. Specifically, first, using the head 0, the divided data A is recorded from a sector 0 to a sector 2 of the system region of the recording surface 0. In the example shown in FIG. 5B, a time corresponding to the passage of two sectors past the heads 0 and 1 transpires while switching from head 0 to head 1. Therefore, the divided data B is recorded from a sector 5 to a sector 7 of the system region of the recording surface 1 corresponding to head 1, since the two sectors correspond to the head switching time. In other words, there is a shift from a sector 0 which is a recording start sector in the head 1 by a length (five sectors) including the length (three sectors) of data which is recorded in each recording surface in addition to the switching time (two sectors) from the head 0 to the head 1. That is, the recording of the divided data B in the system region of the recording surface 1 using the head 1 is started from the sector 5 which is calculated by adding to the original recording start sector the number of sectors corresponding to the head switching time and the length of the recorded data.

Similarly, using the head 2, the divided data C is recorded from a sector 10 to a sector 12 of the system region of the recording surface 2, and the parity data is recorded from a sector 15 to a sector 17 of the system region of the recording surface 3 using the head 3 after an interval of two sectors corresponding to the head switching time. That is, sectors corresponding to the head switching time are provided between a recording start sector of a second recording surface in which system data are recorded and a recording completed sector of a first recording surface, wherein the first recording surface immediately precedes the second recording surface. In other words, the number of the recording start sector of the second recording surface (in a system region) in which the recording will be performed subsequently is shifted by the sum of the length of the previously recorded data and the sectors corresponding to the switching time for switching the head.

Next, the reading process will be described. As described above, FIG. 5B shows an example in which three portions of divided data, which are obtained by dividing system data to be recorded, and parity data are recorded in different system regions of different recording surfaces. Accordingly, in the reading process according to an embodiment, the divided data and the parity data are read from the respective different recording surfaces to restore the system data. In the process of reading these portions of data, the reading from a second recording surface is started after the reading from a first recording surface in which the reading is being performed is completed, and after a head switching time has transpired that allows switching from a first read head RH to a second read head RH.

Specifically, first, using the head 0, the divided data A recorded from the sector 0 to the sector 2 of the system region of the recording surface 0 is read. Here, similarly to the writing process, in the reading process, a time corresponding to, for example, two sectors is required for switching from the head 0 to the head 1. Similarly, a time corresponding to, for example, two sectors is also required for switching of other heads. After reading of the divided data A, the divided data B recorded from the sector 5 to the sector 7 of the system region of the recording surface 1 is read using the head 1 after a time interval corresponding to two sectors transpires. Next, the divided data C recorded from the sector 10 to the sector 12 of the system region of the recording surface 2 is read using the head 2 after a time interval corresponding to two sectors. In addition, the parity data recorded from the sector 15 to the sector 17 of the system region of the recording surface 3 is read using the head 3 after a time interval corresponding to two sectors. That is, sectors corresponding to the head switching time are provided between a reading completion sector of a recording surface (in the system region) in which the reading is performed immediately prior and a reading start sector of a recording surface (in the system region) in which the reading will be performed subsequently. In other words, the reading start sector of the recording surface (in the system region) in which the recording will be performed subsequently is shifted by the sum of the sectors corresponding to the head switching time and the length of the previously read data.

In some embodiments, the recording and the reading of the parity data in the sector 15 to the sector 17 of the system region of the recording surface 3 using the head 3 may not be performed simultaneously with the recording and the reading of the divided data. In addition, the parity data may be recorded ahead of or between the recording of the divided data, rather than after the recording of the divided data. Specifically, the parity data may be recorded in the recording surface 0 and the divided data may be recorded in the recording surfaces 1 to 3. Otherwise, the parity data may be recorded in the recording surface 1 or 2 and the divided data may be recorded in the other recording surfaces. In addition, in each recording surface, the number of the first sector in which the recording is started is not necessarily limited to the sector 0.

As described above, according to the system data writing process and the system data reading process of this embodiment, the recording and the reading in a plurality of system regions of different recording surfaces are executed so that a smaller time cost results when switching the writing head WH or the reading head RH from a first recording surface of a system region and a second recording surface of the system region. That is, according to the disk device and the data recording method of this embodiment, it is possible to properly protect the system data, record the system data in a shorter time, and restore the system data recorded as described above.

Figure 6A:
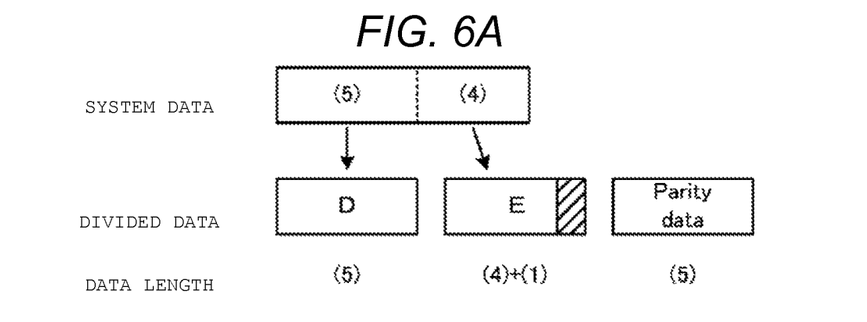
FIGS. 6A and 6B are diagrams conceptually showing modified examples of operations of a system data writing process and a system data reading process according to the embodiment.
Figure 6B:
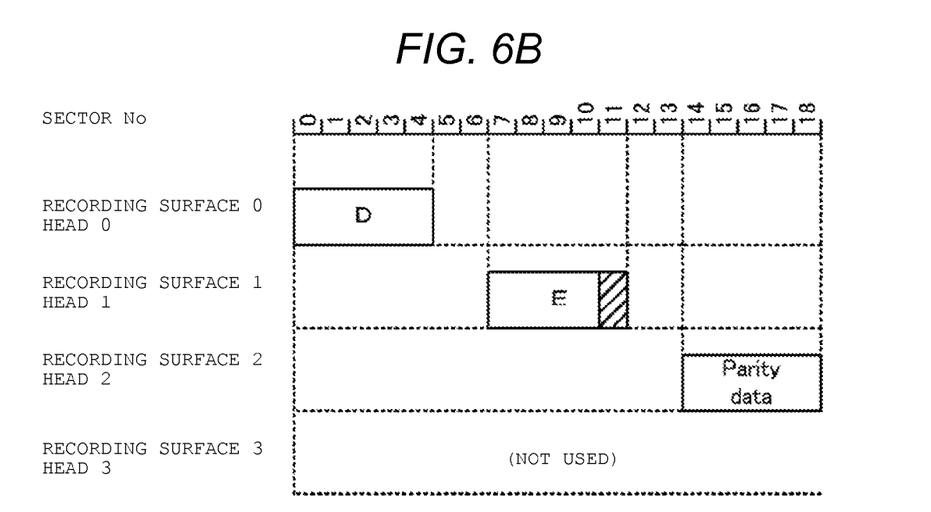

Next, conceptual operations of modified examples of the system data writing process and the system data reading process according to the embodiment will be described using FIGS. 6A and 6B. FIGS. 6A and 6B are diagrams conceptually showing modified examples of the operations of the system data writing process and the system data reading process according to the embodiment.

FIG. 6A is a diagram conceptually showing a modified example of the process of dividing system data. Here, in an exemplary embodiment, the length of the system data to be recorded corresponds to nine sectors, and this system data is divided into two. When nine sectors are divided into two, one sector which is a recording unit is divided in half, and thus it is necessary to avoid this problem. Therefore, as shown in FIG. 6A, the system data which is a recording target is divided into divided data D having a length corresponding to five sectors and divided data E in which data having a predetermined pattern and a length corresponding to one sector is added to divided data having a length corresponding to four sectors. The lengths of the portions of divided data D and E are the same as each other, that is, five sectors. In addition, parity data having the same length as the respective portions of divided data D and E is generated. That is, in this example, the two portions of divided data D and E having a data length corresponding to five sectors and the parity data are each recorded in respective but equally sized recording regions.

FIG. 6B is a diagram conceptually showing a writing process and a reading process related to the plurality (two) of portions of divided data D and E and the parity data. In the example shown in FIG. 6B, the portions of divided data D and E and the parity data are recorded or read in or from recording surfaces 0 to 2 using heads 0 to 2. Since there is no subsequent data to be written, recording or reading in or from a recording surface 3 using a head 3 is not executed. In this example, a head switching time corresponding to two sectors is also required for switching of the heads. First, using the head 0, the divided data D is recorded or read from a sector 0 to a sector 4 of the system region of the recording surface 0. In addition, the divided data E is recorded or read from a sector 7 to a sector 11 of the system region of the recording surface 1 using the head 1 after an interval of two sectors corresponding to the head switching time. Similarly, the parity data is recorded or read from a sector 14 to a sector 18 of the system region of the recording surface 2 using the head 2 after a time interval corresponding to two sectors.

In some embodiments, the recording and the reading of the parity data may not be performed simultaneously with the recording and the reading of the portions of divided data D and E. In addition, the parity data may be recorded ahead of or between the divided data, rather than behind the divided data. Furthermore, the data having a predetermined pattern may not be necessarily added to the end of the divided data E. For example, it may be added to the front or the intermediate part of the divided data E. In addition, the divided data D may correspond to four sectors of the system data and data having a predetermined pattern and a length corresponding to one sector, and the divided data E may correspond to the remaining five sectors of the system data. When the system data is restored after reading of the portions of divided data D and E, the data having a predetermined pattern which is included in the divided data E is removed.

Thus, as described above, in the modified examples of the system data writing process and the system data reading process according to this embodiment, the recording and the reading in a plurality of system regions of different recording surfaces are executed so that a smaller time cost results when switching the writing head WH or the reading head RH. That is, according to the disk device and the data recording method of this embodiment, it is possible to properly protect the system data, record the system data in a shorter time, and restore the system data recorded as described above.

Figure 7A:
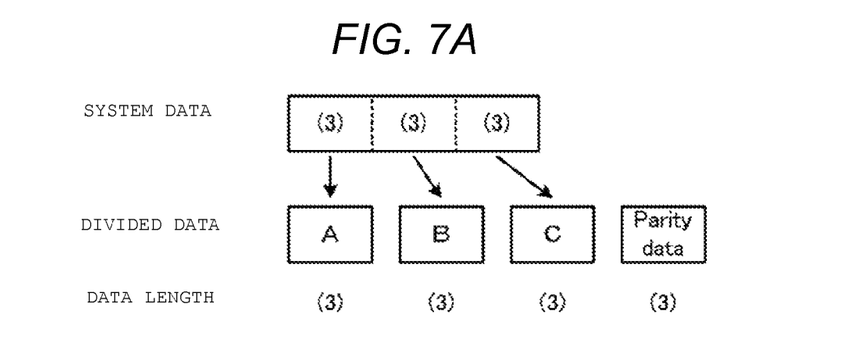
FIGS. 7A and 7B are diagrams conceptually showing other modified examples of operations of a system data writing process and a system data reading process according to the embodiment.
Figure 7B:
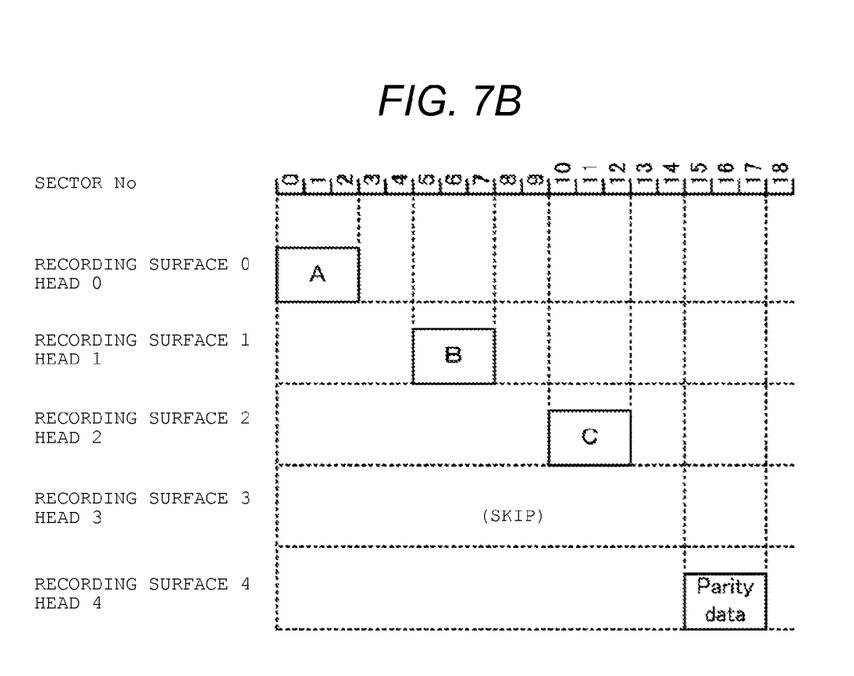

Next, conceptual operations of other modified examples of the system data writing process and the system data reading process according to the embodiment will be described using FIGS. 7A and 7B. FIGS. 7A and 7B are diagrams conceptually showing modified examples of the operations of the system data writing process and the system data reading process according to an embodiment.

FIG. 7A is a diagram conceptually showing a process of dividing system data. Since this case is the same as in FIG. 5A, the detailed description thereof will be omitted. That is, the length of the system data which is a recording target corresponds to nine sectors, and the system data is divided into three portions of divided data A, B, and C having a length corresponding to three sectors. Likewise, parity data having a length equal to three sectors is generated. These three portions of divided data A, B, and C and the parity data are recorded in different recording regions.

FIG. 7B is a diagram conceptually showing a writing process and a reading process related to the plurality (three) of portions of divided data A, B, and C and the parity data. In the example shown in FIG. 7B, the portions of divided data A, B, and C are recorded or read in or from recording surfaces 0 to 2 using heads 0 to 2, and the parity data is recorded or read in or from a recording surface 4 using a head 4. That is, data recording and data reading using a head 3 with a system region disposed on a recording surface 3 are skipped.

In this example, a time corresponding to two sectors is also required for switching of the heads. Specifically, using the head 0, the divided data A is recorded or read from a sector 0 to a sector 2 of the system region of the recording surface 0. The divided data B is recorded or read from a sector 5 to a sector 7 of the system region of the recording surface 1 using the head 1 after an interval of two sectors corresponding to the head switching time. Similarly, the parity data is recorded or read in a sector 10 to a sector 12 of the system region of the recording surface 2 using the head 2 after a time interval corresponding to two sectors. Thus, data recording or data reading in the system region of the recording surface 3 using the head 3 is skipped. In addition, the parity data is recorded or read from a sector 15 to a sector 17 of the system region of a recording surface 4 using a head 4 after a time interval corresponding to two sectors.

In some embodiments, the recording and the reading of the parity data may not be performed simultaneously with the recording and the reading of the portions of divided data A, B, and C. In addition, the parity data may be recorded ahead of or between the divided data, rather than behind the divided data.

Thus, as described above, in other modified examples of the system data writing process and the system data reading process according to this embodiment, the recording and the reading in a plurality of system regions of different recording surfaces are executed so that a smaller time cost results when switching the writing head WH or the reading head RH. That is, according to the disk device and the data recording method of this embodiment, it is possible to properly protect the system data, record the system data in a shorter time, and restore the system data recorded as described above.

In the above-described embodiments, the HDD 10 is exemplified as a disk device. However, the scope of the above-described embodiments may also be applied to hybrid drives provided with a nonvolatile semiconductor memory element (for example, NAND memory, MRAM, FeRAM, and the like) for use as a cash of the magnetic disk 1 as a disk device. In this case, in data exchange between the nonvolatile semiconductor memory element as a cash and the magnetic disk 1 as a main recording medium, the system data writing process and the system data reading process according to the embodiment may be applied.

In addition, a configuration may also be employed in which a plurality of system regions are provided and used in order (or alternately in pairs) when updating identical system data. By virtue of this configuration, for example, when the recording is not normally terminated during recording system data in a certain system region, the possibility of restoring the system data which has not been normally recorded can be improved using the previously recorded system data.

Furthermore, in the recording of system data, information which is used to later determine whether the recorded system data is the latest data may be added. For example, such information may include the cumulative use time and the number of times of recording execution of the HDD 10 can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device with a plurality of recording media, each recording medium having at least one recording surface, the plurality of recording media including a first recording surface and a second recording surface that is different from the first recording surface, where the first and second recording surfaces each includes a corresponding system region for recording system data related to an operation of the disk device, the disk device comprising:
 a controller configured to:
 divide system data into a first portion of divided data and a second portion of divided data, wherein the first portion and the second portion have the same size; and
 after recording the first portion of divided data in the system region of the first recording surface, recording the second portion of divided data in the system region of the second recording surface.

2. The disk device according to claim 1, wherein the second portion is selected based on a duration of time associated with switching a writing head from the system region of the first recording surface to the system region of the second recording surface upon completion of recording the first portion in the system region of the first recording surface.

3. The disk device according to claim 1, wherein the controller is configured to divide system data into multiple divided portions that include the first portion and the second portion, so that the number of divided portions equals the number of recording surfaces on which the system data are recorded.

4. The disk device according to claim 3, wherein the controller is configured to cause each of the divided portions to be recorded on a different one of the recording surfaces.

5. The disk device according to claim 1, further comprising:
 a generation unit configured to generate parity data for the first portion and the second portion, wherein the parity data has a size substantially equal to the size of the first portion.

6. The disk device according to claim 5, wherein the controller is configured to cause the generated parity data to be recorded in a system region disposed on a third recording surface that is different from the first recording surface and the second recording surface.

7. The disk device according to claim 5, wherein the generation unit is configured to generate parity data for the first portion and the second portion by subjecting the first portion and the second portion to an exclusive-OR operation.

8. The device according to claim 6, further comprising:
 a data restoration unit which restores the first portion from all the portions of divided data other than the first portion, and the parity data read from the system region disposed on the third recording surface.

9. The disk device according to claim 8, wherein the controller is further configured to determine if reading of the second portion also fails before the data restoration unit restores the first portion.

10. The disk device according to claim 9, wherein the data restoration unit is configured to not restore the first portion when the reading of the first portion and the reading of the second portion both fail.

11. The disk device according to claim 1, wherein the controller is further configured to, when the system data cannot be divided so that the first portion and the second portion have the same size, add data having a predetermined length to the system data so that the system data can be divided into portions having the same size.

12. The disk device according to claim 1, wherein the controller is configured to divide the system data into a number of divided portions, the number of divided portions being equal to the number of recording surfaces in the plurality of recording media minus the number of recording surfaces having relatively poorer reproduction characteristics or recording characteristics.

13. A data recording method in a disk device that includes a plurality of recording media, each recording medium having at least one recording surface, the method comprising:
 preparing a first recording surface and a second recording surface that is different from the first recording surface, where the first and second recording surfaces each includes a corresponding system region for recording system data related to an operation of the disk device; and
 dividing the system data to be recorded into a plurality of portions of divided data of the same size;
 recording a first portion of divided data from the plurality of portions in a first system region disposed on the first recording surface; and
 starting the recording of a second portion of divided data from the plurality of portions in a second system region disposed on the second recording surface after a predetermined switching time has transpired.

14. The method of claim 13, wherein the predetermined switching time is based on a duration of time associated with switching, upon completion of recording the first portion, from a writing head of the disk device associated with the first system region to a writing head of the disk device associated with the second system region.

15. The method of claim 13, further comprising dividing the system data to be recorded into multiple divided portions that include the first portion and the second portion, so that the number of divided portions equals the number of recording surfaces in the plurality of recording media.

16. The method of claim 14, wherein each of the multiple divided portions is recorded on a different recording surface.

17. The method of claim 13, further comprising generating parity data for the first portion and the second portion, wherein the parity data has a size substantially equal to the size of the first portion.

18. The method of claim 17, further comprising recording the parity data in a third system region disposed on a third recording surface that is different from the first recording surface and the second recording surface.

19. The method of claim 18, further comprising restoring the first portion from all the portions of divided data other than the first portion, and the parity data read from the third system region.

20. The method of claim 13, further comprising, when the system data cannot be divided so that the first portion and the second portion have the same size, adding data having a predetermined length to the system data so that the system data can be divided into portions having the same size data of the same size.

* * * * *